US012729811B2

(12) United States Patent
Yoshioka

(10) Patent No.: US 12,729,811 B2
(45) Date of Patent: Sep. 8, 2026

(54) PRESSURE VESSEL AND METHOD FOR MANUFACTURING PRESSURE VESSEL

(71) Applicant: Yachiyo Industry Co., Ltd., Saitama (JP)

(72) Inventor: Junya Yoshioka, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 19/123,313

(22) PCT Filed: Sep. 28, 2023

(86) PCT No.: PCT/JP2023/035381
§ 371 (c)(1),
(2) Date: Apr. 22, 2025

(87) PCT Pub. No.: WO2024/090128
PCT Pub. Date: May 2, 2024

(65) Prior Publication Data

US 2026/0009502 A1 Jan. 8, 2026

(30) Foreign Application Priority Data

Oct. 24, 2022 (JP) ................................ 2022-169757

(51) Int. Cl.
*F17C 1/16* (2006.01)

(52) U.S. Cl.
CPC ........ *F17C 1/16* (2013.01); *F17C 2201/0109* (2013.01); *F17C 2203/0604* (2013.01);
(Continued)

(58) Field of Classification Search
CPC ................ F17C 2203/0604; F17C 2209/2127
See application file for complete search history.

(56) References Cited

U.S. PATENT DOCUMENTS

2010/0255234 A1* 10/2010 Koetke .................. B29C 49/04
428/35.8
2015/0167893 A1* 6/2015 Nishimoto ............... F17C 1/06
206/524.3

(Continued)

FOREIGN PATENT DOCUMENTS

CN 101858432 A 10/2010
CN 110304331 A 10/2019

(Continued)

OTHER PUBLICATIONS

English translation of JPH0664026 (Year: 1994).*

(Continued)

*Primary Examiner* — Don M Anderson
(74) *Attorney, Agent, or Firm* — Kenealy Vaidya LLP

(57) ABSTRACT

Provided is a pressure vessel comprising a liner and an insert member that are integrally formed by blow molding the liner. The insert member has a cylindrical shape with an inner diameter opening portion. The liner is molded integrally with the insert member by inserting a parison through the inner diameter opening portion and performing blow molding. Since the liner is inserted inside the insert member and is blow molded, a pinched portion is not generated. Consequently, strength of the pressure vessel can be improved, and fluid is prevented from leaking between the liner and the insert member.

4 Claims, 6 Drawing Sheets

(52) U.S. Cl.
CPC .................... *F17C 2203/066* (2013.01); *F17C 2209/2127* (2013.01); *F17C 2209/219* (2013.01); *F17C 2209/232* (2013.01); *F17C 2221/012* (2013.01)

(56) References Cited

U.S. PATENT DOCUMENTS

| | | | | |
|---|---|---|---|---|
| 2016/0114521 | A1* | 4/2016 | Palvoelgyi | B29C 49/20 264/523 |
| 2016/0136864 | A1* | 5/2016 | Miyawaki | B65D 1/023 264/516 |
| 2019/0152312 | A1* | 5/2019 | Park | B60K 15/03 |
| 2021/0086431 | A1 | 3/2021 | Miyawaki et al. | |
| 2021/0086432 | A1 | 3/2021 | Miyawaki et al. | |
| 2021/0237335 | A1 | 8/2021 | Shindo et al. | |
| 2021/0247024 | A1* | 8/2021 | Kronholz | F17C 5/06 |
| 2021/0276239 | A1* | 9/2021 | Horner | B29C 49/1212 |
| 2022/0118673 | A1 | 4/2022 | Miyawaki et al. | |

FOREIGN PATENT DOCUMENTS

| | | | |
|---|---|---|---|
| JP | H0664026 | A | 3/1994 |
| JP | H09-119598 | A | 5/1997 |
| JP | 2006161978 | A | 6/2006 |
| JP | 2016150517 | A | 8/2016 |
| JP | 2017-096319 | A | 6/2017 |
| JP | 2019002506 | A | 1/2019 |
| JP | 2021045860 | A | 3/2021 |
| JP | 2021-119034 | A | 8/2021 |
| JP | 2021-171978 | A | 11/2021 |
| JP | 2022053892 | A | 4/2022 |
| WO | 2013080810 | A1 | 6/2013 |

OTHER PUBLICATIONS

English translation of WO2013080810 (Year: 2013).*

Chinese Office Action for the corresponding Chinese patent application No. 202380074630.0 dated Jul. 16, 2025.

International Search Report and Written Opinion of the International Search Report for PCT/JP2023/035381 dated Dec. 19, 2023.

Extended European Search Report for the corresponding European patent application No. 23882337.1 dated Nov. 19, 2025.

Japanese Office Action for the related Japanese Patent Application No. 2025-079265 dated Jun. 23, 2026.

* cited by examiner

PRESSURE VESSEL AND METHOD FOR MANUFACTURING PRESSURE VESSEL

CROSS-REFERENCE TO RELATED APPLICATION

This application is a U.S. National Stage Application under 35 U.S.C § 371 of International Patent Application No. PCT/JP2023/035381 filed on 28 Sep. 2023, and claims priority under 35 U.S.C. § 119 to Japanese Patent Application No. 2022-169757 filed on 24 Oct. 2022, the disclosures of which are hereby incorporated by reference in their entirety.

TECHNICAL FIELD

The present invention relates to a pressure vessel and a method for manufacturing a pressure vessel.

BACKGROUND ART

As a background art of the present invention, there is a technology described in Patent Document 1. Patent Document 1 relates to the technology for manufacturing a liner of a pressure vessel for containing high-pressure fluid or the like by blow molding. Mouth rings are inserted inside a parison made of semi-fluid resin to be integrally molded with the liner made of resin by blow molding.

CITATION LIST

Patent Document 1

Patent Document 1: Japanese Patent Application Publication H9-119598

SUMMARY OF THE INVENTION

Problems to be Solved

However, in Patent Document 1, when the mouth rings are molded, the parison is sandwiched from an outer side with respect to the mouth rings by a half-split mold so that pinched portions (portions having uneven thickness due to pinch) are formed on a liner portion surrounding outer peripheral portions of the mouth rings. Thus, if the pinched portions are formed, a gap is likely to be formed between the mouth rings and the liner. This may cause the contained fluid to leak from the manufactured pressure vessel. Further, if the pinched portions are formed, a portion where stress is concentrated on is formed due to unevenness in thickness of the liner so that the pressure vessel may be weakened.

Therefore, an object of the present invention is to provide a pressure vessel which is improved in strength and from which fluid is less likely to leak, and a method for manufacturing a pressure vessel.

Solution to Problem

The present invention is a pressure vessel that includes a liner and an insert member integrally formed by blow molding the liner. The insert member has a cylindrical shape to have an inner diameter opening portion, and the liner is integrally molded with the insert member by inserting a parison into the inner diameter opening portion to perform blow molding.

According to the present invention, the liner is inserted inside the insert member to perform blow molding so that a pinched portion is not generated. Accordingly, the pressure vessel is improved in strength, and fluid is prevented from leaking between the liner and the insert member.

Further, it is preferable that the liner has an inlet/outlet portion in contact with the inner diameter opening portion, and a sealing surface is formed at the inlet/outlet portion by inserting a blow pin having a stepped portion on an outer peripheral surface thereof into a portion serving as the inlet/outlet portion of the parison from an outer side during the blow molding.

According to the present invention, a molding cycle can be shortened, and molding accuracy of the sealing surface can be improved.

The present invention is a method for manufacturing a pressure vessel comprising steps of: holding a cylindrical insert member having an inner diameter opening portion as a first step; inserting a parison into an inner diameter opening portion of the insert member and the molding die as a second step; and supplying air via a blow pin after the second step, and transferring the parison to a molding surface of the molding die and the inner diameter opening portion to perform blow molding as a third step.

According to the present invention, the liner is inserted inside the insert member to perform blow molding so that a pinched portion is not generated. Accordingly, the pressure vessel is improved in strength, and fluid is prevented from leaking between the liner and the insert member.

Further, in the third step, the blow pin having a stepped portion on an outer peripheral surface thereof is inserted from an outer side into a portion serving as an inlet/outlet portion in contact with the inner diameter opening portion of the parison to form a sealing surface in the inlet/outlet portion.

According to the present invention, a molding cycle can be shortened, and molding accuracy of the sealing surface can be improved.

Advantageous Effects of the Invention

According to the present invention, a pressure vessel which is improved in strength and from which fluid is unlikely to leak and a method for manufacturing a pressure vessel can be provided.

DETAILED DESCRIPTION OF EMBODIMENTS

Embodiments of the present invention will be described hereinbelow.

First Embodiment

Figure 1:
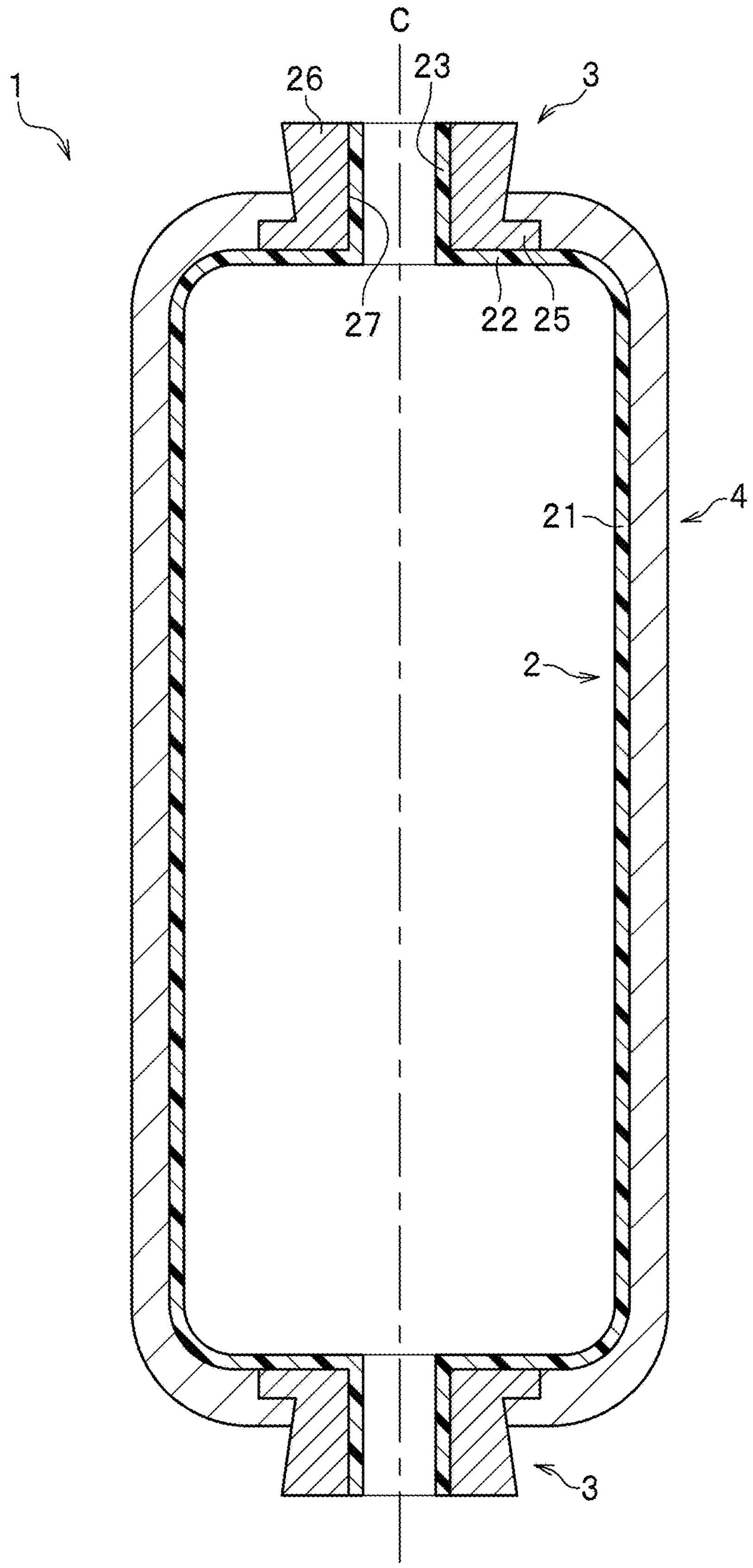
FIG. 1 is a longitudinal sectional view of a pressure vessel according to a first embodiment of the present invention.

FIG. 1 is a longitudinal sectional view of a pressure vessel according to a first embodiment of the present invention. In each drawing mentioned below, for convenience, descriptions are made on an assumption that an upper side of the drawing is an upper side and a lower side of the drawing is a lower side, but the present invention is not limited thereto.

As shown in FIG. 1, a pressure vessel 1 according to the present embodiment is a hollow vessel filled with high-pressure fluid such as a hydrogen gas. The pressure vessel 1 includes a liner 2, insert members 3 such as mouth rings, and a reinforcing layer 4. Note that, in the pressure vessel 1 of the present embodiment, the insert members 3 are provided on the upper and lower sides, respectively, but only one of the insert members 3 may be provided.

The liner 2 is a hollow vessel made of resin and is a member that forms an inner side of the pressure vessel 1. The liner 2 is formed to have substantially the same thickness. The liner 2 includes a body portion 21, a shoulder portion 22, and an inlet/outlet portion 23. The body portion 21 is a portion that has a cylindrical shape and forms a central portion. The shoulder portion 22 extends in a direction orthogonal to a central axis C between the body portion 21 and the inlet/outlet portion 23. The shoulder portion 22 has an opening at the center and has a circular shape. The inlet/outlet portion 23 is continuous from the opening of the shoulder portion 22 and has a cylindrical shape. The inlet/outlet portion 23 is formed in parallel with the central axis C. The inlet/outlet portion 23 is a portion through which fluid flows in and out.

The insert member 3 is made of metal and is a member for allowing fluid to flow in and out from the pressure vessel 1. The insert member 3 includes a flange portion 25 and a cylindrical portion 26. The flange portion 25 has a ring shape and extends radially outward with respect to the central axis C. The cylindrical portion 26 extends from the flange portion 25 and has a cylindrical shape. An outer periphery of the cylindrical portion 26 is increased in diameter toward a distal end, but may be reduced in diameter or constant. The opening of the cylindrical portion 26 is referred to as an “inner diameter opening portion 27”.

The shoulder portion 22 of the liner 2 is in surface contact with a lower surface (end surface) of the flange portion 25. Further, the inlet/outlet portion 23 of the liner 2 is in surface contact with an inner surface of the inner diameter opening portion 27 in the entire circumferential direction and along the direction of the central axis C. The liner 2 and the insert member 3 are integrally molded in a manufacturing step described below. That is, a parison made of molten resin is inserted into the inner diameter opening portion 27 to perform blow molding so that the liner 2 is integrally molded with the insert member 3.

The reinforcing layer 4 is a resin layer that covers an outer side of the pressure vessel 1. More specifically, the reinforcing layer 4 covers the body portion 21 and a part of the shoulder portion 22 of the liner 2, and covers the flange portion 25 and a part of the cylindrical portion 26 of the insert member 3. The reinforcing layer 4 is formed by, for example, impregnating reinforcing fibers with an adhesive and overlapping the reinforcing fibers on an inner layer by filament winding. The reinforcing layer 4 is provided so that the pressure vessel 1 can be increased in strength.

Next, a description will be given of a method for manufacturing the pressure vessel 1 shown in FIG. 1. The present manufacturing method is realized by sequentially performing the following first to fourth steps.

(1) First Step

Figure 2:
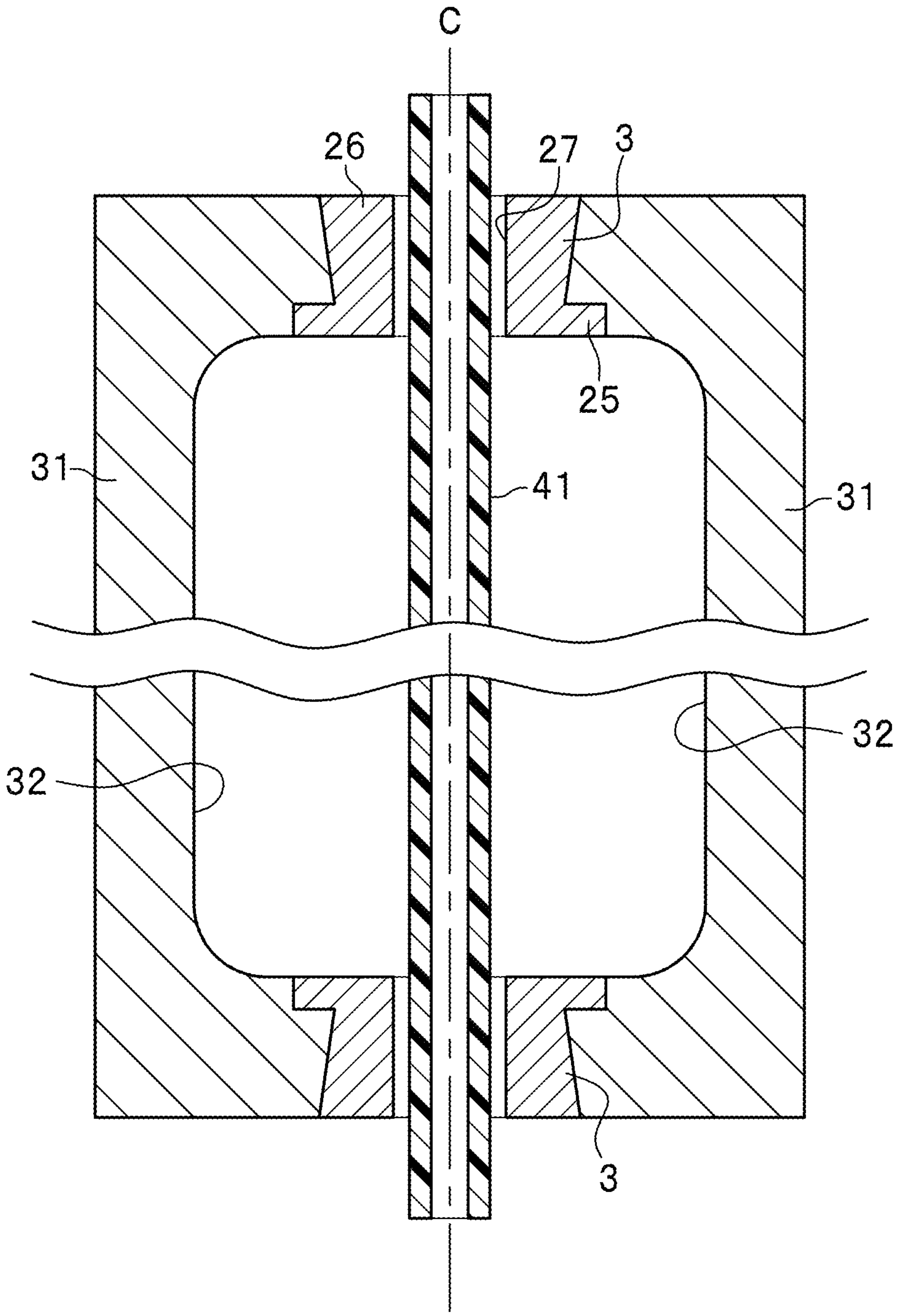
FIG. 2 is a longitudinal sectional view for describing a first step and a second step of a method for manufacturing a pressure vessel according to the first embodiment of the present invention.

FIG. 2 is a longitudinal sectional view for describing a first step and a second step of the method for manufacturing a pressure vessel of the first embodiment. As shown in FIG. 2, in the first step, a pair of upper and lower insert members 3 are held in a state of being clamped by a pair of molding dies 31. The molding dies 31, 31 are die materials for blow molding the liner 2. The molding dies 31,31 are movable in a direction close to and away from the central axis C, respectively. An inner surface of the molding die 31 is a molding surface 32 for molding the liner 2. The insert members 3 are held by the molding dies 31, 31 in a state where the cylindrical portions 26 face outward, respectively. Note that the insert members 3 are held by the molding dies 31, but may be held by a lifting device or other holding devices.

(2) Second Step

After the first step, a parison 41 is inserted into each inner diameter opening portion 27 of each insert member 3 and a hollow portion (cavity) formed by the clamped molding dies 31, 31. The parison 41 is molten resin and has a cylindrical shape.

(3) Third Step

Figure 3:
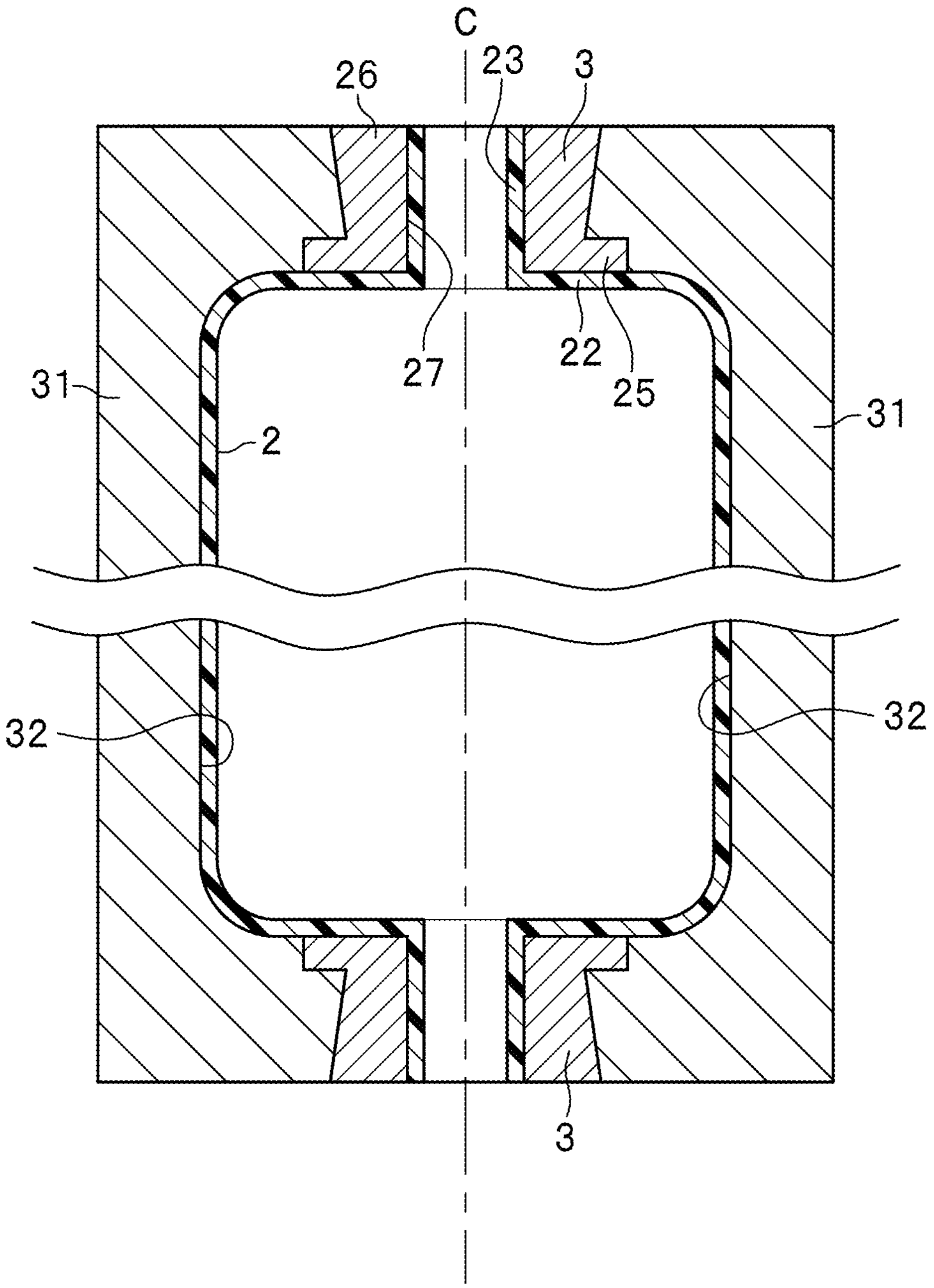
FIG. 3 is a longitudinal sectional view for describing a third step of the method for manufacturing a pressure vessel according to the first embodiment of the present invention.

After the second step, a blow pin (not shown) is inserted inside the parison 41 to supply air, and the parison 41 is transferred to the molding surfaces 32 of the molding dies 31, the lower surfaces (end surfaces) of the flange portions 25 of the insert members 3, and the inner diameter opening portions 27 of the insert members 3 by blow molding. FIG. 3 is a longitudinal sectional view for describing a third step of the method for manufacturing the pressure vessel of the present embodiment. As shown in FIG. 3, the parison 41 is supplied with air to be brought into close contact with the molding surfaces 32, the lower surfaces (end surfaces) of the flange portions 25 of the insert members 3, and the inner diameter opening portions 27 of the insert members 3. In this way, the liner 2 can be formed from the parison 41 as a material. Then, the blow pin is removed, and when the molded liner 2 is cooled and solidified, the liner 2 is removed from the molding dies 31. In addition, burrs spilled over outside the insert members 3 are cut and removed.

(4) Fourth Step

After the third step, the reinforcing layer 4 is formed on an outer periphery of the liner 2 and the insert members 3

(see FIG. 1). The reinforcing layer 4 is formed by, for example, filament winding in which reinforcing fibers impregnated with an adhesive are wound around the liner 2.

According to the pressure vessel 1 and the method for manufacturing the same described above, the parison 41 is inserted through the inner diameter opening portions 27, and thus the inlet/outlet portions 23 of the blow molded liner 2 can be brought into close contact with inner sides of the inner diameter opening portions 27 in a uniform thickness. That is, the parison 41 is provided in the inner diameter opening portions 27 of the insert members 3 so that the parison 41 for molding the inlet/outlet portions 23 is not crushed by the molding dies 31, 31 when the molding dies 31, 31 are clamped. Thus, a pinched portion (portion having an uneven thickness due to pinch) is not formed in the inlet/outlet portions 23, and hence leakage of fluid such as a hydrogen gas from a gap between the liner 2 and the insert members 3 is prevented. Further, the pinched portion is not formed so that the inlet/outlet portions 23 can be formed to have a uniform thickness. Accordingly, stress can be prevented from concentrating on a part of the inlet/outlet portions 23 to improve strength.

Second Embodiment

Each of the embodiments described below basically has the structure of the pressure vessel 1 described in the first embodiment, and is manufactured by substantially the same manufacturing method. Therefore, in each of the following embodiments, descriptions of the configuration common to the embodiment described above are omitted, and the same reference numerals are used for the same members and the like. The second embodiment differs from the first embodiment in that a sealing surface is provided on which a sealing member is mounted.

Figure 4:
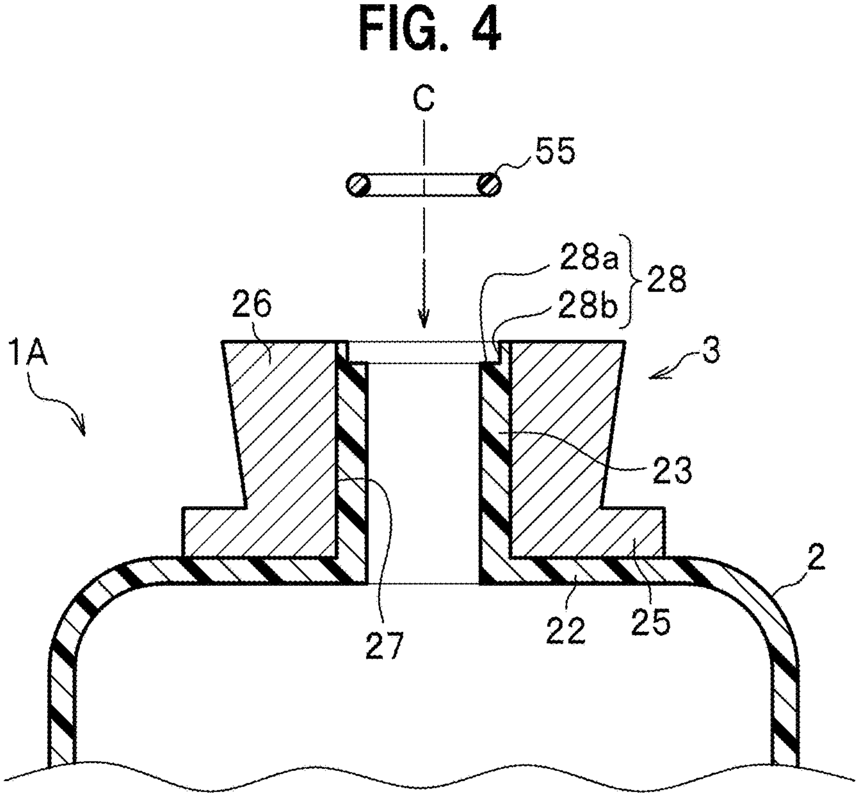
FIG. 4 is a longitudinal sectional view of a periphery of an insert member of the pressure vessel formed with use of a blow pin having a stepped portion in a second embodiment of the present invention.

FIG. 4 is a longitudinal sectional view of a periphery of the insert member in the pressure vessel formed with use of a blow pin having a stepped portion in a second embodiment of the present invention. Note that the reinforcing layer 4 is not shown in FIG. 4. As shown in FIG. 4, in a presser vessel 1A of the second embodiment, a stepped portion 28 is formed at the distal end of the inlet/outlet portion 23. The inlet/outlet portion 23 has a constant outer diameter as that in the first embodiment. The stepped portion 28 is formed by a stepped bottom surface 28*a* and a stepped side surface 28*b* extending upward from an outer edge of the stepped bottom surface 28*a*. A sealing member 55 (for example, an O-ring or the like) is mounted on the stepped portion 28. The stepped bottom surface 28*a* is a portion serving as a sealing surface of the sealing member 55. The sealing member 55 is mounted on the stepped portion 28, and, for example, when a valve (not shown) is connected to the insert member 3, leakage of fluid can be prevented.

Figure 5:
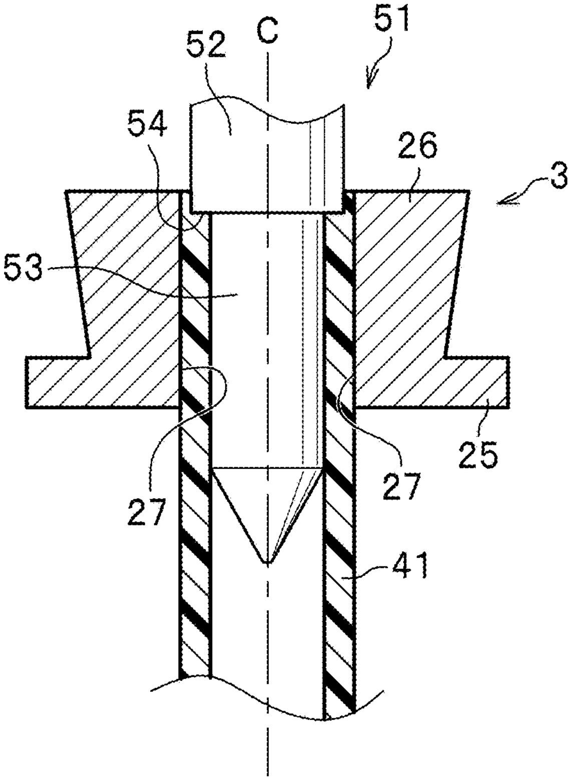
FIG. 5 is a longitudinal sectional view of the periphery of the insert member in a state where the blow pin is inserted through an entrance of a parison in a third step of the method for manufacturing a pressure vessel according to the second embodiment of the present invention.

FIG. 5 is a longitudinal sectional view of the periphery of the insert member in the third step of the method for manufacturing a pressure vessel according to the second embodiment of the present invention, where the blow pin is being inserted into an entrance of the parison. As shown in FIG. 5, the blow pin 51 includes a cylindrical large-diameter portion 52 on a base end side and a cylindrical small-diameter portion 53 having a diameter smaller than that of the large-diameter portion 52. An outer diameter of the large-diameter portion 52 is larger than an inner diameter of the parison 41 and smaller than an outer diameter of the parison 41. Further, the outer diameter of the large-diameter portion 52 is smaller than the inner diameter opening portion 27. The inlet/outlet portion 23 is molded by an outer peripheral surface of the blow pin 51 and the inner diameter opening portion 27.

Further, a ring-shaped stepped portion 54 is formed by the large-diameter portion 52 and the small-diameter portion 53. When the stepped portion 54 is inserted from an outer side (outer side along the central axis C) to the part as the inlet/outlet portion 23 of the parison 41, the stepped portion 54 is a portion for molding a sealing surface, which will be described later, at an entrance as a part of the inlet/outlet portion 23.

In the third step, when blow molding is performed, the blow pin 51 is inserted inside the parison 41 from the outer side along the central axis C. The insertion portion corresponds to a portion as the inlet/outlet portion 23 of the parison 41. At this time, a tip of the large-diameter portion 52 is inserted to be positioned lower than an end surface of the cylindrical portion 26. Thus, a molding surface of the inlet/outlet portion 23 is formed between the outer peripheral surface of the blow pin 51 and the inner diameter opening portion 27. That is, by performing blow molding in the state shown in FIG. 5, the stepped bottom surface 28*a* and the stepped side surface 28*b* can be molded at the tip of the inlet/outlet portion 23 by the stepped portion 54 while the inlet/outlet 23 is molded.

Conventionally, when the sealing surface is formed, the tip of the inlet/outlet portion 23 or a part of the insert member 3 is cut off after blow molding. However, according to the method, there arises problems that the number of steps increases, the sealing surface is not constant, and sealing property is not stable.

In this regard, according to the present embodiment, the sealing surface (stepped bottom surface 28*a*) can be molded with use of the blow pin 51, there is no need to perform a separate operation, and the sealing surface can be formed simultaneously with the blow molding step (third step). Accordingly, a molding cycle is shortened. Further, the sealing surface is molded by the stepped portion 54 of the blow pin 51 so that molding accuracy of the sealing surface can be enhanced, and the sealing property can be stable.

Third Embodiment

The third embodiment is different from the first embodiment in that a sealing surface is provided on which a sealing member is mounted, and is different from the second embodiment regarding the structure of the sealing surface.

Figure 6:
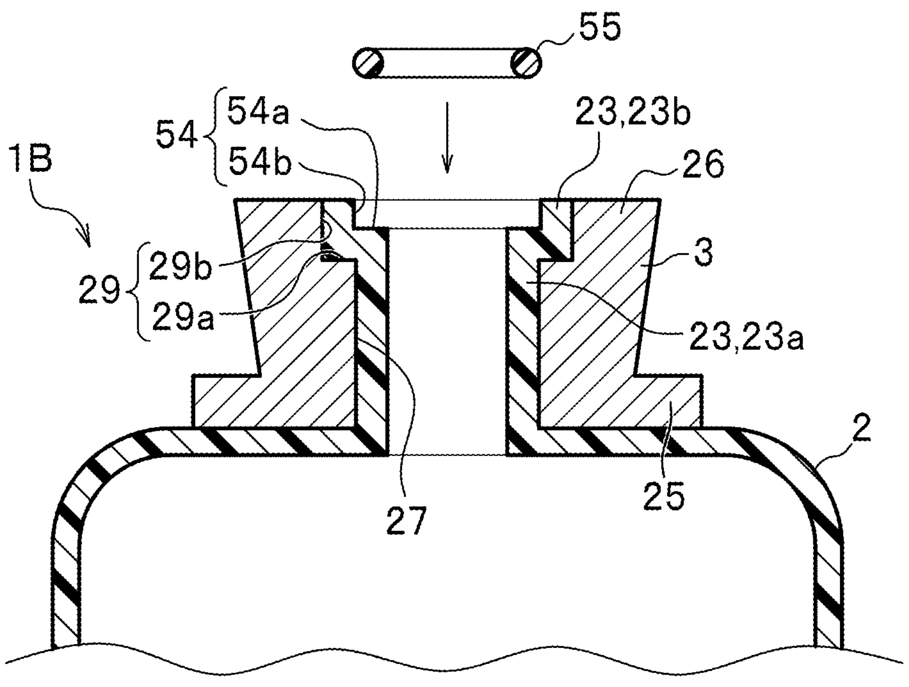
FIG. 6 is a longitudinal sectional view of the periphery of the insert member of the pressure vessel formed with use of the blow pin having stepped portions in a third embodiment of the present invention.

FIG. 6 is a longitudinal sectional view of the periphery of the insert member in a pressure vessel formed with use of a blow pin having a stepped portion in the third embodiment of the present invention. As shown in FIG. 6, the inlet/outlet portion 23 includes a base portion 23*a* and an enlarged-diameter portion 23*b* having a larger diameter than the base portion 23*a*. The base portion 23*a* and the enlarged-diameter portion 23*b* form the stepped portion 54. The stepped portion 54 is formed by a stepped bottom surface 54*a* and a stepped side surface 54*b* extending upward from an outer edge of the stepped bottom surface 54*a*. The sealing member 55 (for example, an O-ring or the like) is mounted on the stepped portion 54. The stepped bottom surface 54*a* is a portion serving as a sealing surface of the sealing member 55.

A stepped portion 29 is formed inside the cylindrical portion 26 of the insert member 3. The stepped portion 29 is constituted by a stepped bottom surface 29*a* and a stepped side surface 29*b* extending upward from an outer edge of the stepped bottom surface 29*a*. The stepped portion 54 of the inlet/outlet 23 is in close contact with a shape of the stepped portion 29 of the insert member 3.

Figure 7:
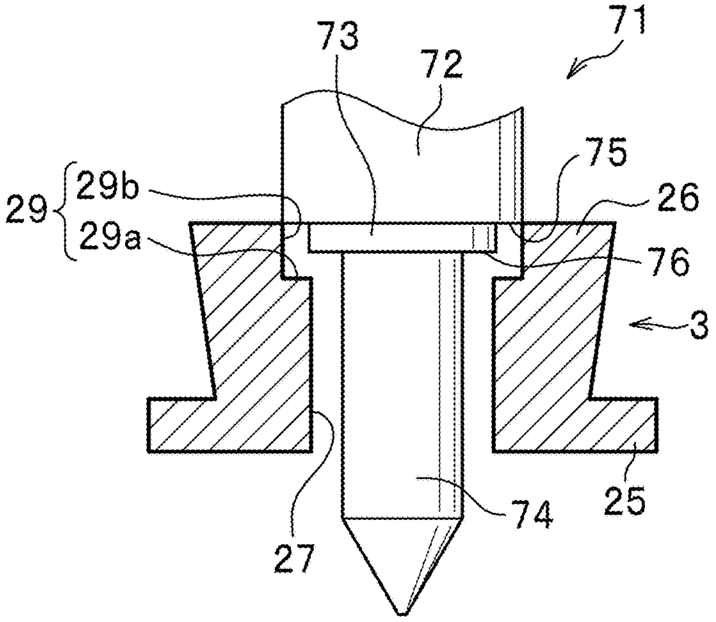
FIG. 7 is a longitudinal sectional view of the blow pin and the insert member in the third embodiment of the present invention.
Figure 8:
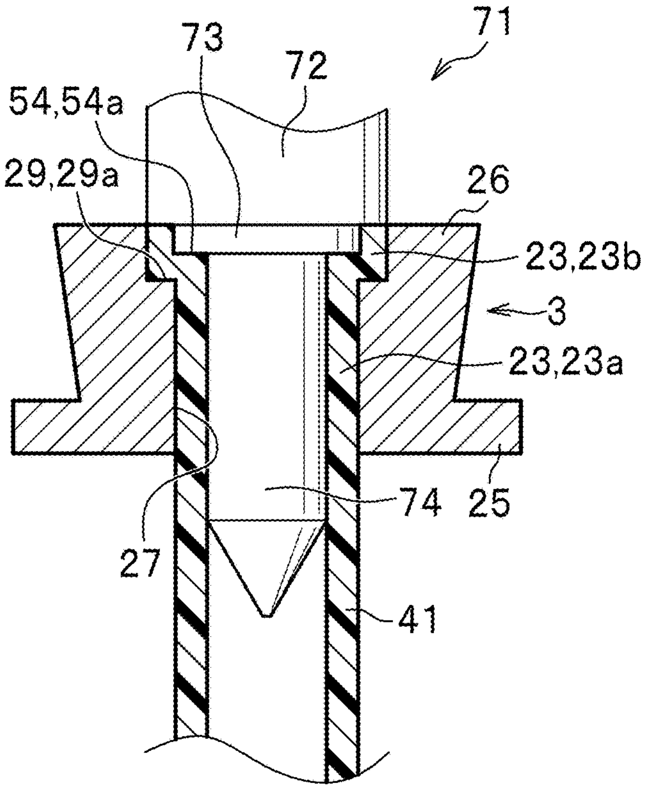
FIG. 8 is a longitudinal sectional view of the periphery of the insert member in a state where the blow pin is inserted through the entrance of the parison in the third embodiment of the present invention.

FIG. 7 is a longitudinal sectional view of the blow pin and the insert member according to the third embodiment of the present invention. FIG. 8 is a longitudinal sectional view around the insert member in a state where the blow pin is inserted from the entrance of the parison in the third embodiment of the present invention. As shown in FIG. 7, a blow pin 71 includes a large-diameter portion 72, a medium-diameter portion 73, and a small-diameter portion 74. The large-diameter portion 72 and the medium-diameter portion 73 form a first stepped portion 75. The medium-diameter portion 73 and the small-diameter portion 74 form a second stepped portion 76. An outer diameter of the large-diameter portion 72 is the same as an outer diameter of the stepped side surface 29*b* of the stepped portion 29. An outer diameter of the medium-diameter portion 73 is the same as an inner diameter of the inner diameter opening portion 27. A height of the medium-diameter portion 73 is smaller than that of the stepped side surface 29*b* of the stepped portion 29. A region surrounded by the insert member 3 and an outer peripheral surface of the blow pin 71 is a portion for molding the inlet/outlet portion 23. Further, the second stepped portion 76 is a portion for molding the stepped bottom surface 54*a* serving as a sealing surface when the parison 41 is inserted.

As shown in FIG. 8, in the third step, when blow molding is performed, the blow pin 71 is inserted inside the parison 41 from the outer side along the central axis C. At this time, the blow pin 71 is inserted such that a tip of the large-diameter portion 72 is flush with the end surface of the cylindrical portion 26. The inlet/outlet 23 is molded by the region surrounded by the insert member 3 and the outer peripheral surface of the blow pin 71. Further, the stepped portion 54 on which the seal member 55 is mounted is molded simultaneously.

According to the present embodiment, the sealing surface (stepped bottom surface 54*a*) can be molded with use of the blow pin 71, another operation is not necessary, and the sealing surface can be formed simultaneously with the blow molding step (third step). This can shorten a molding cycle. Further, the first stepped portion 75 and the second stepped portion 76 of the blow pin 71 are used for molding, molding accuracy of the sealing surface can be enhanced, and the sealing property can be stable. Furthermore, with the blow pin 71, the enlarged-diameter portion 23*b* can be formed in the inlet/outlet portion 23.

The embodiments of the present invention are described above, but the present invention can be appropriately changed without departing from the spirit of the present invention.

REFERENCE SYMBOLS

1, 1A, 1B pressure vessel
2 liner
3 insert member
23 inlet/outlet portion
27 inner diameter opening portion
31 molding die
41 parison
51,71 blow pin

The invention claimed is:

1. A pressure vessel comprising a liner and an insert member integrally formed by blow molding the liner, wherein the insert member has a cylindrical shape to have an inner diameter opening portion along a central axis, and the liner is integrally molded with the insert member by inserting a parison into the inner diameter opening portion to perform blow molding, the liner includes a cylindrical body portion, an inlet/outlet portion disposed inside the inner diameter opening portion, and a shoulder portion which connects the body portion with the inlet/outlet portion, and the inlet/outlet portion is formed to extend along an entire length in an axial direction of the inner diameter opening portion.

2. The pressure vessel according to claim 1, wherein the liner has an inlet/outlet portion in contact with the inner diameter opening portion, and a sealing surface is formed at the inlet/outlet portion by inserting a blow pin having a stepped portion on an outer peripheral surface thereof into a portion serving as the inlet/outlet portion of the parison from an outer side during the blow molding.

3. A method for manufacturing a pressure vessel comprising steps of:

holding a cylindrical insert member having an inner diameter opening portion along a central axis as a first step;

inserting a parison into the inner diameter opening portion of the insert member and a molding die as a second step; and supplying air via a blow pin after the second step, and transferring the parison to a molding surface of the molding die and the inner diameter opening portion to perform blow molding as a third step, a liner of the pressure vessel includes a cylindrical body portion, an inlet/outlet portion disposed inside the inner diameter opening portion, and a shoulder portion which connects the body portion with the inlet/outlet portion, and the inlet/outlet portion is formed to extend along an entire length in an axial direction of the inner diameter opening portion.

4. The method for manufacturing a pressure vessel according to claim 3, wherein, in the third step, the blow pin having a stepped portion on an outer peripheral surface thereof is inserted from an outer side into a portion serving as an inlet/outlet portion in contact with the inner diameter opening portion of the insert member to form a sealing surface in the inlet/outlet portion.

* * * * *